June 4, 1929.  J. J. QUERTINMONT  1,715,568

GLASS FURNACE

Filed April 4, 1928

Inventor
Jules J. Quertinmont,
by M. Schoubou
Attorney

Patented June 4, 1929.

1,715,568

UNITED STATES PATENT OFFICE.

JULES J. QUERTINMONT, OF POINT MARION, PENNSYLVANIA.

GLASS FURNACE.

Application filed April 4, 1928. Serial No. 267,296.

This invention relates to improvements in glass furnaces which are particularly adapted to uninterruptedly and uniformly supply molten glass of a constant temperature, homogeneous texture and fluidity to a series or battery of continuous sheet glass drawing machines, as shown, for example, in my U. S. Patent, No. 1,541,772, dated June 7, 1925, in conjunction with which is used a series of supplying float or "debiteuse" of the construction shown in my prior U. S. Patent, No. 1,529,086, dated March 10, 1925.

The objects of the invention are:

First, to construct and arrange the walls of the furnace and the different passageways for the molten glass to pass from the melting or reheating chamber to the several interconnected chambers of the drawing tank so that the homogeneity, temperature and fluidity of said molten glass is preserved throughout its mass and the drawing tank and enable the molten glass adjacent to the outer walls to be constantly kept in motion and avoid any possibility of abnormal chilling and prevent said molten glass from having a temperature lower than the glass at the center section of the tank and remote from said outer walls.

Second, to provide a construction of glass furnace of the character above indicated in which the partition walls separating the drawing tanks and passageways for the molten glass are so disposed and incorporated in the body of the furnace to not only act as partitions to subdivide the drawing tank into a plurality of interconnected reheating and drawing chambers but at the same time to reinforce said tank and firmly support the bridges or arches of the roof over said reheating and drawing chambers on said partition walls.

Third, to provide a construction and arrangement of glass furnace adapted for use in connection with the drawing of a plurality of continuous sheets of glass by a battery of glass drawing machines in conjunction with a series of alternately arranged reheating and drawing chambers, so that the molten glass will not only be of the same homogeneity, temperature and fluidity throughout its mass and at the several supplying floats or "debiteuse" in the different drawing chambers, but said molten glass will be uniformly, constantly and properly distributed throughout the width and length of the sheet forming opening of each supplying float or "debiteuse", thereby insuring a maximum and uniform product of sheet glass from each and all of the drawing machines of the battery operating from the several drawing chambers.

Fourth, other objects and advantages of the improved transverse partitions or separating walls of the furnace will appear from the detailed description of the construction and arrangement of the parts and mode of operation to be hereinafter given.

The invention consists of structural characteristics and relative arrangements of elements which will be hereinafter more fully described and particularly pointed out in the appended claims.

In the drawings, in which similar reference characters indicate the same parts in the several figures, Figure 1 is a top plan view of the subdivided drawing tank, as shown, for example, in my hereinbefore referred to U. S. Patent, No. 1,541,772, and taken on line I—I of Figure 2, with the means for heating the same removed;

Figure 1:
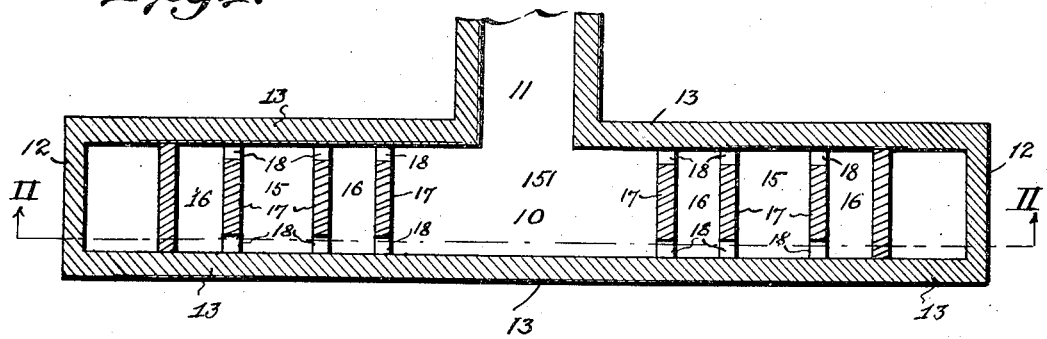

Referring to Figures 1, 2 and 3, 10 is the narrow and elongated drawing tank which is connected by means of the usual reheating passageway 11 to a primary or melting furnace not shown.

Said elongated drawing tank is formed as usual by end walls 12, 12 and longitudinal walls 13, 13 resting on any suitable base construction or bottom 14, and is subdivided into a series of or a plurality of alternately arranged interconnected reheating chambers 15 and drawing chambers 16. Said reheating chambers 15 and drawing chambers 16 are separated by transverse partitions or separating walls 17 having openings 18 at their ends adjacent to the inner sides of the longitudinal walls 13, 13 to place the adjacent reheating chambers 15 and drawing chambers 16 in communication with each other at their sections adjacent to the longitudinal walls 13, 13, and permit the molten glass adjacent to said walls 13, 13 to easily pass or progressively flow from the primary reheating chamber 151 in communication with the reheating passageway 11 with the plurality of the drawing chambers 16, 16 on each side of said primary reheating chamber 151, as shown.

As will be seen from the drawings, the transverse partitions or separating walls 17 having the side openings 18 are preferably imperforate at their middle portions and rest firmly on the bottom or base 14, and, hence, said construction and arrangement of partitions or separating walls 17 provide firm and rigid supports for each of the upper arches or roofs 19, 19 of the drawing chambers 16, 16, and assist in carrying the weight of the arches or roofs 20, 20 of the reheating chambers, and avoid all danger of said arches or roofs from sagging or collapsing, as when there is no intermediate support for the same between the longitudinal walls 13, 13.

In each of the drawing chambers 16, 16 is provided the usual supplying float or "debiteuse" 21, preferably of the construction shown in my former U. S. Patent, No. 1,529,086, or disclosed in my copending application, Serial No. 261,444, filed March 14, 1928, from which the sheets of glass G are drawn by any suitable glass drawing machines, not shown, and readily understood and need no further disclosure.

Figure 2:
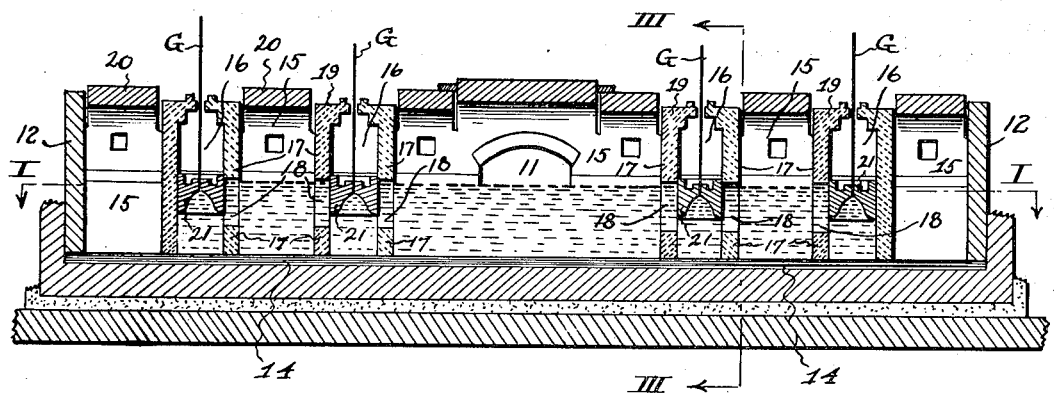
Figure 2 is a longitudinal section of the drawing tank taken on line II—II of Figure 1.
Figure 3:
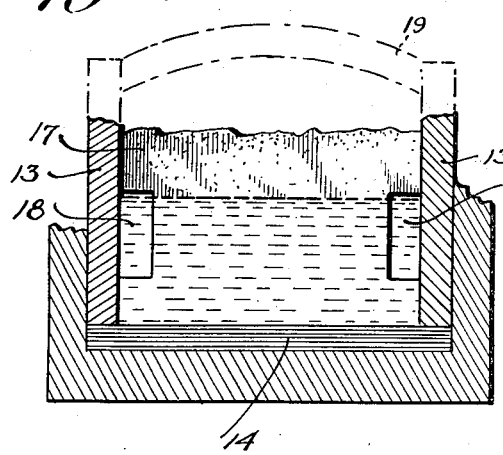
Figure 3 is an enlarged transverse sectional view taken on line III—III of Figure 2.
Figure 4:
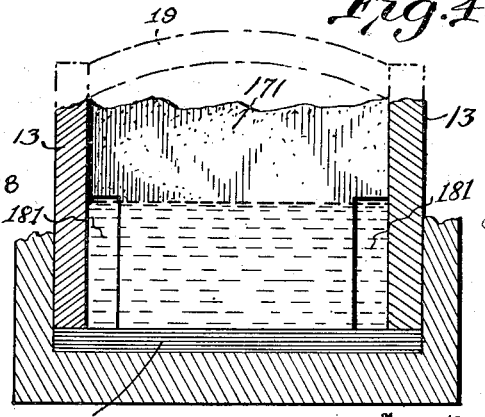
Figure 4 is a sectional view, similar to Figure 3, of a modified form.

In Figure 4 is shown a modified form of the transverse partitions or separating walls, and instead of having the openings 18 above the bottom or base 14, as shown in Figures 2 and 3, there are provided in said partitions or walls 171, openings 181, adjacent to the longitudinal walls 13, 13, said openings 181 extending down to the bottom or base 14, and upwardly and below the level of the molten glass, preferably six or seven inches, as illustrated.

From the foregoing disclosure of the construction and arrangement of the openings in the transverse partitions or walls separating the interconnected and alternately arranged reheating and drawing chambers, the molten glass adjacent to the longitudinal walls is permitted to constantly flow along said walls and through said openings and permit other glass to take its place and, hence, prevent dangerous chilling of same. This constant movement of the molten glass not only causes a proper supply of molten glass to flow into each end of the drawing chambers and evenly throughout the bottom of the length and breadth of the sheet forming slot of the supplying float or "debiteuse", but insures a supply of molten glass of the proper and constant temperature, viscosity and texture to produce a sheet of drawn glass which is free of the usual defects, and of same texture, homogeneity, lustre and brilliancy throughout its length and on both sides of the sheet, and enables the use of the simplest form of supplying float or "debiteuse" in which no provision is required to be made for the difference of temperatures or viscosities of the molten glass from the center towards the ends of the sheet forming slots, as in supplying floats now in general use.

From the foregoing description of the invention, it will be seen that the molten glass is properly supplied and distributed to the several or battery sheet glass drawing machines to insure the efficient and simultaneous production of a plurality of finished sheets of glass devoid of any distortion, waves, or internal strain, and with surfaces of high and uniform lustre and brilliancy throughout both sides of its entire width and length.

Furthermore, it will be seen that all the objects and advantages recited in the statement of invention have been fully and efficiently carried out, and while I have shown two and the preferred forms of the same, it will be understood that many other forms, changes or variations of said partitions or separating walls will readily suggest themselves without in any way departing from the present invention or evading the scope of the claims.

What I claim is:

1. A glass furnace for drawing continuous sheets of glass, comprising a drawing tank having a bottom, longitudinal and end walls and divided into a series of alternating drawing and reheating chambers, transverse partition walls resting on said bottom and separating said drawing and reheating chambers and provided with openings adjacent to said longitudinal walls to permit the body of molten glass in contact with and in proximity to said longitudinal walls to flow through said openings from said reheating chambers into the drawing chambers during the drawing of the sheets of glass.

2. A glass furnace for drawing continuous sheets of glass, comprising a drawing tank having a bottom, longitudinal and end walls and divided into a series of alternating drawing and reheating chambers, transverse partition walls resting on said bottom at their middle sections, and separating said drawing and reheating chambers and provided with openings adjacent to said longitudinal walls to permit the body of molten glass in contact with and in proximity to said longitudinal walls to flow through said openings from said reheating chambers into the drawing chambers during the drawing of the sheets of glass.

3. A glass furnace for drawing continuous sheets of glass, comprising a drawing tank having a bottom, longitudinal and end walls and divided into a series of alternating drawing and reheating chambers, arches covering said reheating chambers, transverse partition walls resting on said bottom and supporting said arches and separating said drawing and reheating chambers and provided with openings adjacent to said longitudinal walls to permit the body of molten glass in contact with and in proximity to said longitudinal walls to flow through said openings from said reheating chambers into the drawing chambers during the drawing of the sheets of glass.

4. A glass furnace for drawing continuous sheets of glass, comprising a drawing tank having a bottom, longitudinal and end walls and divided into a series of alternating drawing and reheating chambers, transverse partition walls resting on said bottom and separating said drawing and reheating chambers and provided with openings extending to said bottom and adjacent to said longitudinal walls to permit the body of molten glass in contact with and in proximity to said longitudinal walls to flow through said openings from said reheating chambers into the drawing chambers during the drawing of the sheets of glass.

5. A glass furnace for drawing continuous sheets of glass, comprising a drawing tank having a bottom, longitudinal and end walls and divided into a series of alternating drawing and reheating chambers, transverse partition walls resting on said bottom and separating said drawing and reheating chambers, said drawing and reheating chambers provided with openings adjacent to said longitudinal walls to permit the body of molten glass in contact with and in proximity to said longitudinal walls to flow through said openings from said reheating chambers into the drawing chambers during the drawing of the sheets of glass.

6. A glass furnace for drawing continuous sheets of glass, comprising a drawing tank having a bottom, longitudinal and end walls and divided into a series of alternating drawing and reheating chambers, arches covering said reheating chambers, transverse partition walls resting on said bottom and supporting said arches and separating said drawing and reheating chambers, said drawing and reheating chambers provided with openings adjacent to said longitudinal walls to permit the body of molten glass in contact with and in proximity to said longitudinal walls to flow through said openings from said reheating chambers into the drawing chambers during the drawing of the sheets of glass.

In testimony whereof, I hereunto affix my signature.

JULES J. QUERTINMONT.